United States Patent

Numakura

[15] 3,660,596

[45] May 2, 1972

[54] RECORDING AND REPRODUCING SYSTEM FOR COLOR VIDEO SIGNAL

[72] Inventor: Toshihiko Numakura, Tokyo, Japan

[73] Assignee: Sony Corporation, Tokyo, Japan

[22] Filed: May 15, 1970

[21] Appl. No.: 37,692

[30] Foreign Application Priority Data

Jan. 26, 1970 Japan....................................45/6857

[52] U.S. Cl.........................178/5.2, 178/5.4 CD, 178/6.6 A

[51] Int. Cl.........................................................H04n 1/22

[58] Field of Search....................178/5.2, 5.4 CR, 5.4, 6.6 A; 325/65

[56] References Cited

UNITED STATES PATENTS

| | | | |
|---|---|---|---|
| 2,884,485 | 4/1959 | Shlachter | 178/5.4 |
| 2,960,563 | 11/1960 | Anderson | 178/5.4 CR |
| 3,461,226 | 8/1969 | Carnt | 178/5.4 CR |
| 2,776,410 | 1/1957 | Guanella | 325/65 |
| 3,202,928 | 8/1965 | Prior | 325/65 |

*Primary Examiner*—Robert L. Griffin
*Assistant Examiner*—Richard P. Lange
*Attorney*—Lewis H. Eslinger, Alvin Sinderbrand and Curtis, Morris & Safford

[57] ABSTRACT

A composite color video signal may be magnetically recorded by separating the luminance and chrominance signals, frequency-modulating the luminance signal on a carrier, and frequency-shifting the chrominance signal such that the bands of the frequency-modulated luminance signal and the frequency-converted chrominance signal do not overlap. The two signals are then combined and magnetically recorded with the frequency-converted chrominance signal amplitude modulating the frequency-modulated luminance signal. To avoid a beat interference between a harmonic, particularly the second harmonic of the carrier of the frequency-converted chrominance signal and the luminance signal, there is provided a compensation signal which is an integral multiple of the frequency of the carrier of the frequency-converted chrominance signal, and which is phase-shifted with respect to said carrier so that, when the compensation signal is added to the luminance signal either before frequency-modulation in the recording operation, or after demodulation of the frequency-modulated luminance signal in the reproducing operation, the described beat interference is avoided. By avoiding the beat interference the amplitude of the frequency-converted chrominance signal relative to the amplitude of the frequency-modulated luminance signal, as recorded, can be made large with resulting good signal-to-noise ratio of the reproduced chrominance signal.

14 Claims, 5 Drawing Figures

Patented May 2, 1972 3,660,596

3 Sheet-Sheet 1

INVENTOR

TOSHIHIKO NUMAKURA

BY Louis H. Eslinger

ATTORNEY

INVENTOR
TOSHIHIKO NUMAKURA
BY
ATTORNEY

INVENTOR

TOSHIHIKO NUMAKURA

BY

ATTORNEY

RECORDING AND REPRODUCING SYSTEM FOR COLOR VIDEO SIGNAL

The invention relates generally to a system for magnetically recording and reproducing color video signals.

The color video signals for transmissi on in the United States have been standardized by the (NTSC) as composite signals consisting of a luminance signal, and a modulated chrominance signal comprised of subcarriers having a standard frequency of about 3.58 MHz. In such composite color signals, the frequency band of the chrominance signal is within that of the luminance signal.

A system heretofore proposed for recording and reproducing this composite signal effects separation of the luminance signal and the chrominance signal from the composite color video signal. The separated luminance signal is frequency-modulated, and the separated chrominance signal has its frequency band shifted or converted below the frequency band of the frequency-modulated luminance signal. The level of the frequency-converted chrominance signal has to be small relative to the level of the luminance signal, as recorded, in order to avoid a beat interference when reproduced. Because of the small amplitude of the recorded chrominance signal, a small band width pilot signal is also prepared to help reconstitute the chrominance signal. The frequency-modulated luminance signal is combined with the frequency shifted or converted chrominance signal, and with the pilot signal, which has a frequency band below the frequency band of the chrominance signal, to constitute the combined signal which is magnetically recorded. When the recorded combined signal is magnetically reproduced, the frequency-modulated luminance signal, frequency-converted chrominance signal and pilot signal are extracted. Then the extracted frequency-modulated luminance signal is demodulated; the pilot signal separated; and the frequency-converted chrominance signal, its level controlled on the basis of the detected variations in the level of the separated pilot signal, has its frequency band shifted to substantially its original limits controlled at least partly on the basis of the pilot signal. The reconstituted chrominance signal is then combined with the demodulated luminance signal to substantially reconstitute the composite color video signal. Such a system is shown and described in co-pending U.S. Pat. application Ser. No. 34,751, filed on Nov. 8, 1968, now U.S. Pat. No. 3,610,916, and assigned to the same assignee as the present application.

In magnetically recording the combined signal in the above system, the frequency-modulated luminance signal is used as a bias signal for the frequency-converted chrominance signal. Since the band of frequencies of the frequency-converted chrominance signal is less than that of the frequency-modulated luminance signal, the former can be, and in fact is, recorded as an amplitude modulation of the frequency-modulated luminance signal.

A direct consequence of this mode of recording is that the level of the frequency-converted chrominance signal has to be selected so as to be relatively small in relation to the level of the frequency-modulated luminance signal. For example, the level difference is such that the level ratio is approximately one-tenth to one-twentieth, or that the level of the frequency-converted chrominance signal is from about 5 to 10 percent of the level of the frequency-modulated luminance signal.

This low level of the recorded frequency-converted chrominance signal is disadvantageous in that, when the frequency-converted chrominance signal is reconverted to substantially its original frequency band, the reproduced chrominance signal has a poor signal-to noise ratio. If the level of the frequency-converted chrominance signal is increased in order to improve the signal-to-noise ratio, a beat interference appears in the reproduced picture, as previously mentioned. The beat interference was thought to be the result of the frequency-converted chrominance signal being including in the reproduced luminance signal.

However, through research it has been discovered that the interference beat is caused mostly by the second harmonics of the carrier frequency of the frequency-converted chrominance signal. The second harmonic, as well as the basic carrier or fundamental carrier frequency and other harmonics thereof, appear in the reconstructed luminance signal, but the second harmonic signal has a relatively higher level than the signals corresponding to the fundamental carrier frequency and its other harmonics. Because of its high level the second harmonic causes deterioration of the reproduced picture. The fundamental and other harmonic signals, being relatively low level signals, do not distort the picture and can be neglected. According to the invention, I have devised arrangements for avoiding the deterioration caused by the second harmonic of the carrier frequency of the frequency-converted chrominance signal to thereby permit an increase in the level of the frequency-converted chrominance signal. Such deterioration is avoided by producing an additional or compensation signal whose frequency is an integral multiple, for example, the second harmonic of the carrier frequency of the frequency-converted chrominance signal and phase shifting the compensation signal prior to combining it with the luminance signal so that the second harmonic is cancelled from the subsequently reconstituted luminance signal. Consequently, the level of the frequency-converted chrominance signal can be increased for recording with a resulting stronger reconstituted chrominance signal having a higher signal-to-noise ratio.

Accordingly, it is an object of this invention to provide a system for recording and/or reproducing color video signals wherein the reproduced picture is relatively free from beat interference.

Another object of the invention is to provide a system for recording and/or reproducing color video signals wherein the reproduced chrominance signal has good signal-to-noise ratio.

Another object of this invention is to provide a simplified system for recording and/or reproducing color video signals in the form of a combined signal containing a frequency-modulated luminance signal and a frequency-converted chrominance signal.

Another object of the invention is to provide a system for recording and reproducing color video signals wherein a frequency-modulated luminance and frequency-converted chrominance signals are combined with an additional or compensation signal which cancels the second harmonic of the carrier of the frequency-converted chrominance signal.

Still another object of the invention is to provide a method of avoiding beat interference in the recording and/or reproducing of color video signals.

According to the invention, there is provided an improved system for recording and/or for reproducing a composite color video signal consisting of a luminance signal and a chrominance signal. The recording portion has means for extracting the luminance signal and the chrominance signal from said composite signal; means for frequency-modulating said luminance signal; means for frequency-converting the chrominance signal; means for combining said frequency-modulated luminance signal with said frequency-converted chrominance signal; and means for magnetically recording said combined signal. The reproducing portion has means for magnetically reproducing the magnetically recorded combined signal; means for extracting said frequency-modulated luminance signal and frequency-converted chrominance signal from said reproduced signal; means for demodulating the luminance signal; means for reconverting the chrominance signal and means for combining said demodulated luminance signal with said reconverted chrominance signal so as to substantially reconstitute the composite color video signal. In the improved system a compensation signal having a frequency which is a whole multiple of the carrier frequency of the frequency-converted chrominance signal is provided along with means for phase-shifting the compensation signal and for combining that phase-shifted compensation signal with the luminance signal, so as to avoid a beat interference. The compensation signal frequency, in one embodiment, is equal to the frequency of the second harmonic of the carrier of the frequency-converted chrominance signal and preferably the harmonic is the second. In certain embodiments the compensation signal is applied to the luminance signal in the recording portion prior to frequency modulation thereof; and in others, it is applied to the luminance signal in the reproducing portion after demodulation of the frequency-modulated luminance signal.

The invention also embraces a method of avoiding a beat interference in a recorded and reproduced color video signal including the steps of, providing a compensation signal of a frequency and phase related to the carrier of the frequency-converted chrominance signal, such that, upon combining the compensation signal with a luminance signal, the compensation signal cancels the components of the frequency-converted chrominance signal which, in the absence of the compensation signal, appear in the reproduced luminance signal.

A fuller appreciation of the above, and other objects, features and advantages of the invention will appear from the following description of illustrative embodiments which is to be read in connection with the accompanying drawings, wherein.

Figure 1:
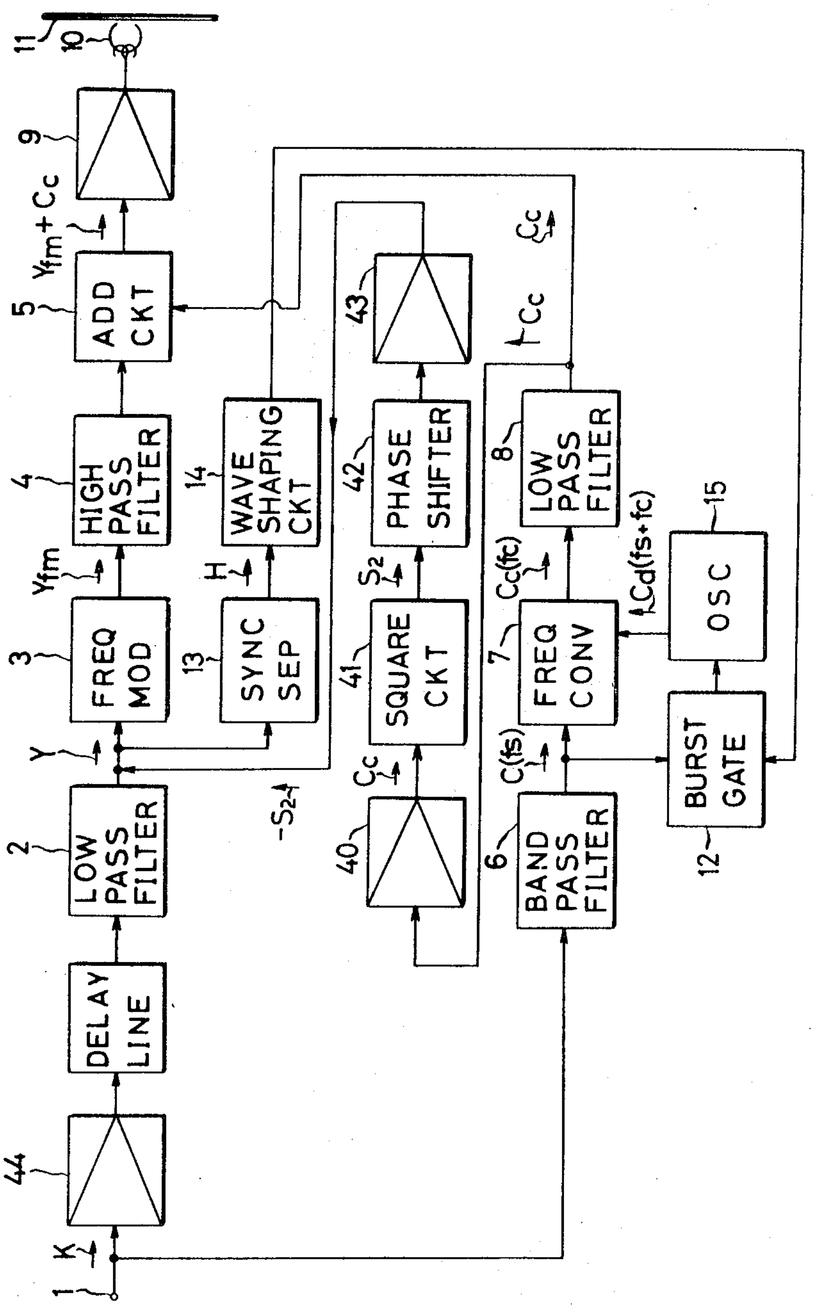
FIG. 1 is a schematic block diagram showing a system for magnetically recording color video signals in accordance with one embodiment of the invention.

Referring to FIG. 1 of the drawings, it will be seen that, in a system for magnetic recording according to the embodiment of the invention there shown, an input terminal 1 is provided to receive an input signal K which is to be magnetically recorded and reproduced. Although the system of the present invention is applicable to various input signals, the embodiment as hereinafter described is presented as utilizing a NTSC system composite color television signal Such composite signal consists of a luminance signal Y and a modulated chrominance signal C(fs) made up of color subcarriers of approximately 3.58 MHz which are modulated with I and Q and are 90° out of phase with each other. The exact subcarrier is 3.579545 MHz, but for convenience is referred to here as 3.58 MHz. It being understood that the exact frequency is used in the system.

Figure 2:
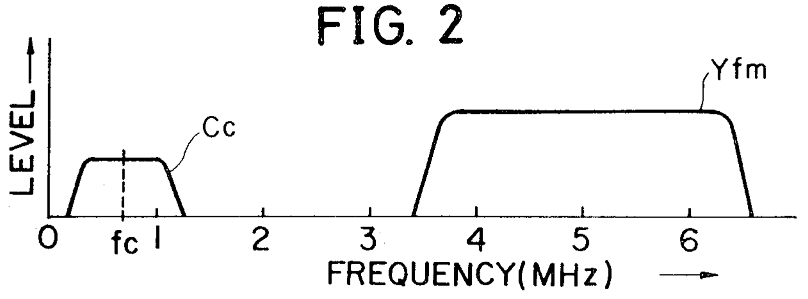
FIG. 2 is a diagram showing the frequency band width characteristic of the frequency-modulated luminance signal, and the frequency shifted or converted chrominance signal.

In the system, means are provided to frequency-modulate the luminance signal Y. As shown, such means may include a delay line and low-pass filter 2 of about 3 MHz, which filter separates the luminance signal from the composite signal; and a frequency modulator 3 which modulates a carrier wave with the luminance signal, so that, for example, the tip level of the synchronizing signal corresponds to about 3.5 MHz and the white peak level corresponds to about 6.5 MHz as shown in FIG. 2. The resulting frequency-modulated signal Yfm is then supplied through a high-pass filter 4 to an add circuit 5.

The chrominance signal C(fs) is extracted from composite signal K by a band pass filter 6 which has for example a band width of ∓ 0.6 MHz with the center of the frequency band fs being at 3.58 MHz. The signal C(fs) is supplied to a frequency converter 7 which may be constructed in the form of a balanced modulator. Further, a part of the extracted modulated chrominance signal C(fs) is supplied to a burst gate or burst signal extracting circuit 12 so that a burst signal B(fs) of 3.58 MHz is obtained.

The burst gate 12 is also synchronized with the horizontal synchronous signal of the luminance signal by means of a horizontal synchronous signal separator 13 and wave shaping circuit 14 connected between the output of low-pass filter 2 and the burst gate 12 to extract the horizontal synchronization signal from the output of filter 2 and provide a gate signal to the burst gate 12. The burst signal B(fs) is supplied from gate 12 to an oscillator 15 which provides to the frequency converter a signal Ca(fs + fc), in which, fs is 3.58 MHz and fc is the desired carrier frequency of the frequency-converted chrominance signal, e.g., 1.06 MHz, so that fs + fc is approximately 4.64 MHz. The fc frequency is chosen to place the band of the frequency-converted chrominance signal below the band of the frequency-modulated luminance signal as shown in FIG. 2.

The output from oscillator 15 is applied to the frequency converter 7 to beat down the frequency band of chrominance signal C(fs) so that the frequency-converted chrominance signal Cc(fc) that issues from converter 7 will have a band width of about ± 0.6 MHz with its center shifted to that of the fc signal, i.e., approximately 1.06 MHz. The frequency-converted chrominance signal Cc(fc) is supplied through a low-pass filter 8, and then to the add circuit or mixer circuit 5 of the signal synthesizer type.

Since the frequency-modulated luminance signal Yfm is also supplied to signal synthesizer circuit 5, the latter produces a combined signal (Yfm + Cc) in which the frequency band of the frequency-converted chrominance signal is below the lower limit of the frequency band of the frequency-modulated luminance signal Yfm as shown in FIG. 2. The combined signal Yfm + Cc produced in add circuit 5 is amplified by amplifier 9 and is recorded on a magnetic tape 11 by means of a magnetic head 10.

When the combined signal is recorded with the system as described above and then reproduced with the frequency-modulated luminance signal being demodulated and the frequency-converted chrominance signal restored substantially to its original band position, interference beats may appear in the reconstituted luminance signal, and it has been determined that the second harmonic of the carrier of the frequency-converted chrominance signal is a major cause of the interference beats. This will be realized from the following discussion with reference to FIG. 3. For ease of understanding, suppose that the frequency-modulated luminance signal is modulated to only one frequency (fy) and that the frequency-converted chrominance signal also consists of only one frequency (fc) which is its carrier frequency. The combined signal magnetically recorded on a magnetic tape and reproduced therefrom includes, in addition to the frequency-modulated luminance signal and the frequency-converted chrominance signal, beat signals resulting from beating between the luminance signal frequency fy and the carrier frequency fc. By reason of the hysteresis characteristics of the magnetic tape and the recording and reproducing heads, such beat signals will have frequencies represented by fy ± *n*fc, where *n* is a positive integral number. Further, as shown on FIG. 3, the beat signals at fy − 2fc and fy + 2fc have the maximum level, that is, the beat signals resulting from the second harmonic of the carrier of the frequency-converted chrominance signal are of greatest amplitude.

Figure 3:
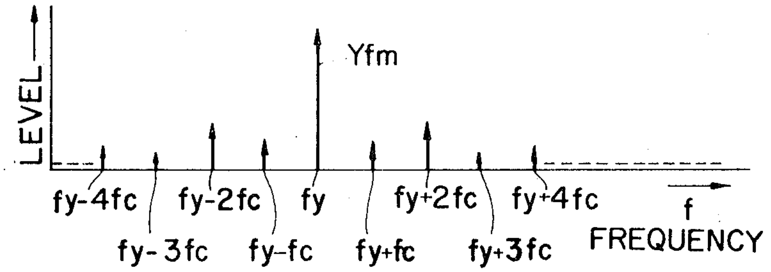
FIG. 3 is a diagram showing a frequency spectrum and illustrating the frequency relationship that may exist between the czrrier frequencies of the frequency-modulated luminance signal and the frequency-converted chrominance signal.

When the recorded signal having the spectrum of FIG. 3 is reproduced and the luminance signal is frequency demodulated, the demodulated luminance signal includes the signals whose frequencies are represented as *n*fc. Thus, not only is the true luminance signal Y reproduced, but also the carrier fc and its harmonics *n*fc are also reproduced and appear in the luminance signal. These signals at the fundamental frequency and the harmonics of the carrier of the frequency-converted chrominance signal, when reproduced with the luminance signal, cause the best interference in the reproduced picture.

Since the signal corresponding to the second harmonic, that is, having a frequency twice that of the carrier frequency fc of the chrominance signal, and which is reproduced with the luminance signal, has a relatively large level compared with the signals corresponding to the carrier frequency and its other harmonics, as shown in FIG. 3, it is the described second harmonic which causes most of the deterioration in the reproduced picture. All other signals are able to be substantially neglected in the interference. If that major source of beat interference can be removed, the level at which the frequency-converted chrominance signal is recorded may be increased, so that the reproduced chrominance signal may have a good signal-to-noise ratio.

In accordance with this invention, the beat interference is avoided by adding to the luminance signal, either in the recording operation or the reproducing operation, a compensation signal which is an integral multiple of the frequency (fc) of the carrier of the frequency-converted chrominance signal and which is phase shifted with respect to said carrier.

In the embodiment of FIG. 1, such phase-shifted compensation signal $-S_2$ is shown applied in the recording operation, for example, between the low-pass filter 2 and the frequency modulator 3, i.e., before the luminance signal is frequency-modulated. The compensation signal applied in FIG. 1 has the frequency of the second harmonic of the carrier frequency fc of the frequency-converted chrominance signal, and is of opposite phase thereto.

Figure 4:
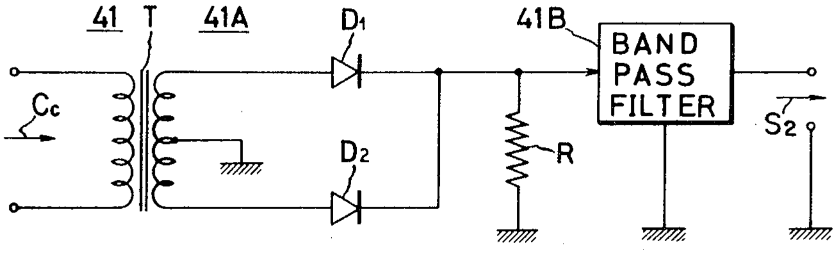
FIG. 4 is a schematic wiring diagram of a portion of the system of FIG. 1.

In order to provide such compensation signal in the system of FIG. 1, a portion of the frequency-converted chrominance signal emerging from low-pass filter 8 is applied to an amplifier 40 and then to a square circuit 41, which is shown in detail in FIG. 4 and described below. Square circuit 41 provides the signal $S_2$ which has the same frequency as the second harmonic 2fc. This signal is then applied to a phase shifter 42 which phase shifts signal $S_2$ 180° and provides the compensation signal $-S_2$. The signal $-S_2$ is then applied through an amplifier 43 to the luminance signal Y prior to the luminance signal being frequency-modulated.

According to my research, the beat interference is best avoided when the relation between the level *ar* of the frequency-converted chrominance signal Cc and the level *ap* of the compensation signal is represented by the equation: $ap = k \times ar^2$, in which $k$ is a constant. In order to provide compensation signal $-S_2$ with a level which is proportional to the square of the level of the frequency-converted chrominance signal, the square circuit 41 of FIG. 4 is shown to comprise a full-wave rectifier circuit 41 consisting of a transformer T and diodes D1 and D2. The output of the rectifier is applied to a band pass filter 41B through which only the frequency of second harmonic 2fc passes. This signal is shown at the output of the band pass filter 41B as signal $S_2$ which is phase-shifted in the subsequent phase shifter 42 to the signal $-S_2$ having the required phase and level for application through the amplifier 43.

It will be apparent that, in the arrangement described above with reference to FIG. 1, the compensation signal $-S_2$ is combined with the luminance signal prior to the frequency modulation thereof, and is therefore included in the recorded combined signal which also includes the frequency-converted chrominance signal. The effect of such compensation signal, upon magnetic reproduction of the combined signal, separation and demodulation of the luminance signal, and separation and reconversion of the chrominance signal to its original carrier frequency, is to cancel out the beat interference in the luminance signal; which beat interference, as previously described, primarily results from the second harmonic of the carrier frequency of the frequency-converted chrominance signal being included in the reproduced luminance signal by reason of the hysteresis characteristics of the magnetic tape and/or magnetic recording and reproducing heads.

Although the compensation signal $-S_2$ applied in the system of FIG. 1 has a frequency which is twice the frequency of the carrier of the frequency-converted chrominance signal, that is, the second harmonic of that carrier, the above described effect, that is, the avoidance of beat interference, may be similarly achieved by applying to the luminance signal, prior to its frequency-modulation in the recording operation, a compensation signal having a frequency that is some other integral multiple of that carrier frequency.

In the above described embodiments of the invention, the compensation signal has been applied to the luminance signal in the recording section, but it is to be understood that the described beat interference may also be avoided by applying a similarly produced compensation signal to the luminance signal after demodulation of the latter in the reproducing section.

Figure 5:
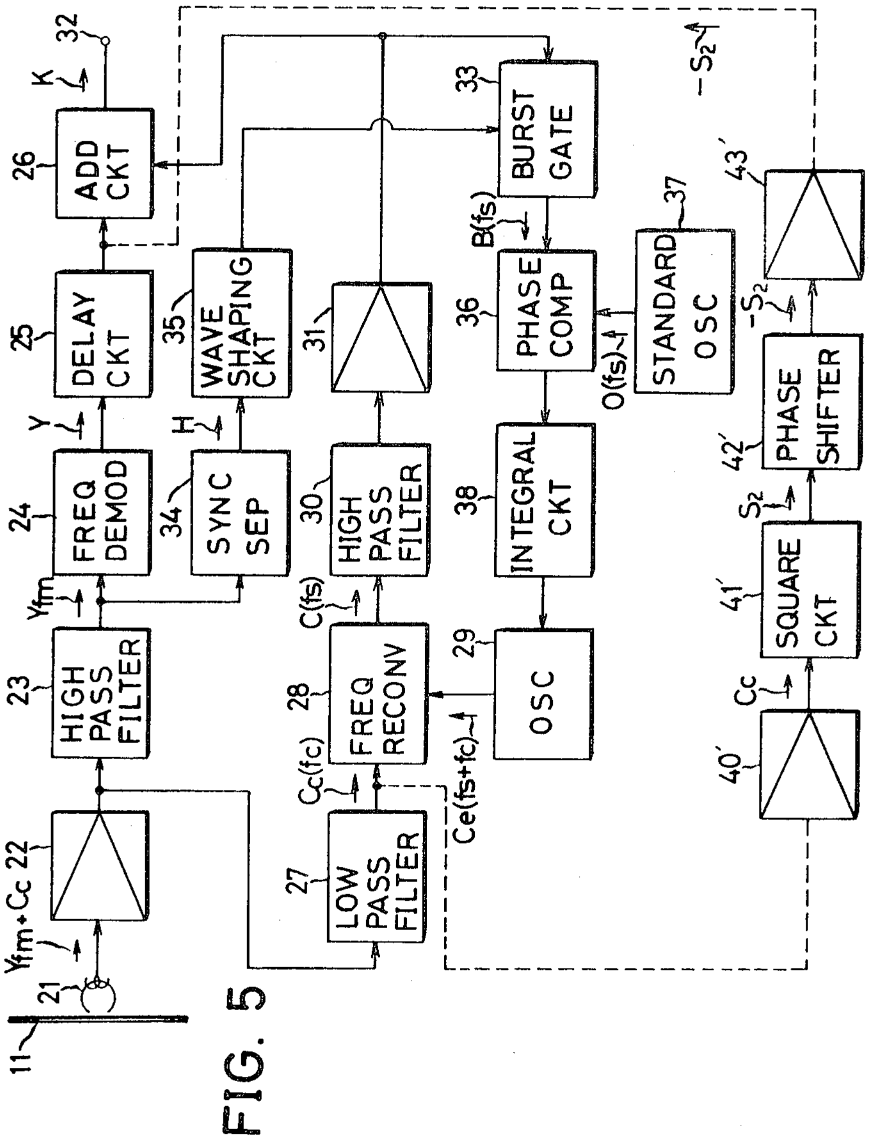
FIG. 5 is a schematic block diagram of a system for magnetically reproducing color video signals in accordance with an embodiment of the invention.

For example, as shown on FIG. 5, the combined signal Yfm + Cc which has been recorded on tape 11 may be reproduced by a magnetic head 21 disposed in contact with the tape. The combined signal thus reproduced is supplied to a playback amplifier 22, and thence through a high-pass filter 23 to separate the frequency-modulated luminance signal from the combined signal. Then signal Yfm is supplied to a frequency demodulator 24 from which is obtained a reconstituted luminance signal Y having a frequency band substantially similar to the original luminance signal. This luminance signal is in turn supplied to a delay circuit 25 and then to an add circuit 26. The combined signal Yfm + Cc provided by the playback amplifier 22 is also supplied to a low-pass filter 27 so that the frequency-converted chrominance signal Cc(fc) is obtained therefrom and supplied to a frequency converter 28 which shifts or converts the carrier frequency from fc (which in the example described above is approximately 1.06 MHz) to its usual carrier frequency of 3.58 MHz in the standard NTSC system.

The frequency reconverter 28 receives a signal Ce(fs + fc) from a variable frequency oscillator 29. The frequency of this signal Ce is approximately 4.65 MHz and is composed of the 3.58 MHz signal and a 1.06 MHz signal. When this 4.64 Hz signal is mixed with and beats with the frequency-converted chrominance signal, the band of the chrominance signal is shifted so as to have its center frequency at 3.58 MHz. The reconverted chrominance signal passes through a high-pass filter 30 and then to an amplifier 31.

The chrominance signal C(fs) is supplied to a gate circuit 33 as the signal to be gated thereby, and the horizontal synchronization signal H is extracted from the frequency-modulated luminance signal by a sync-separator 34 and is also supplied to the gate circuit 33 as the control signal through a wave forming or shaping circuit 34. The burst signal B(fs) is extracted by the gate circuit 33, and this signal B(fs) is supplied to a phase comparator circuit 36.

The output of an oscillator 37 generating the carrier frequency O(fs), is also supplied to the comparator circuit 36 as a standard signal for comparison with burst signal B(fs). The output signal of comparator circuit 36 is supplied to an integral circuit 38, so that the output of this circuit 38 is a DC voltage which corresponds to any deviation of the carrier frequency fs of the chrominance signal C(fs) or its phase from the required frequency and phase. This DC output is supplied to variable oscillator 29 as a control signal. Accordingly, the carrier frequency signal fs of chrominance signal C(fs) from converter 28 is synchronized with the frequency fs generated by the oscillator 37.

The chrominance signal C(fs) from the amplifier 31 is also supplied to the add circuit or synthesizer circuit 26 which combines the chrominance signal with the luminance signal to reconstitute the composite color video signal K which is provided at output terminal 32.

The reproducing system of FIG. 5, as described to this point, is adapted for use with a recording system of the kind previously described and in which a compensating signal is applied to the luminance signal. However, when the compensating signal is to be provided in the reproducing portion of the system rather than in the recording portion, such reproducing portion further includes the components indicated at 40′, 41′, 42′ and 43′ on FIG. 5. More specifically, in the embodiment shown in FIG. 5, the frequency-converted chrominance signal emerging from low-pass filter 27 is applied to amplifier 40′ and then to square circuit 41′, which may be of the kind shown in detail in FIG. 4. Square circuit 41 provides the signal $S_2$ which has the same frequency as the second harmonic 2fc of the carrier of the frequency-converted chrominance signal. This signal is then applied to a phase shifter 42' which phase shifts signal $S_2$ 180° providing the compensation signal $-S_2$ which is applied through an amplifier 43' to the demodulated luminance signal Y between the delay circuit 25 and the add circuit 26.

In the above-described embodiments of the invention, the input signal to the recording and reproducing system has been assumed to be of the standard NTSC type in which the modulated chrominance signal is obtained by modulating with I and Q signals color subcarriers that are 90° out of phase with each other. However, it is apparent that the input to the system according to the invention is not limited to such NTSC type composite signal, but may be a color video signal of the so-called PAL type, in which the phases of the color subcarriers are line-sequentially inverted through 180°.

Further, although the above-described embodiments of the invention actually record and reproduce the combined signal Yfm + Cc(fc) by means of particular magnetic recording and reproducing devices, that is, magnetic heads 10 and 21 engageable with tape 11, it is to be understood that such combined signal Yfm + Cc(fc) may be recorded and reproduced by any other magnetic devices adapted therefor.

It may be noted that the compensation signal may be generated in the recording or reproducing portions of the system and applied to the luminance signal in either portion of the system. Also the compensation signal may be used in conjunction with other schemes that are employed to reduce beat interference in video recording and reproducing systems, for example, as disclosed in the co-pending application for U.S. Letters Patent, Ser. No. 37,696, filed May 15, 1970, of which I am a joint inventor with Morio Yoshimatsu, and which corresponds to Japanese application No. 6856/70.

Although several specific embodiments of the invention have been described in detail herein with reference to the accompanying drawings, it is to be understood that the invention is not limited to those precise embodiments, and that various changes and modifications may be made in the disclosed embodiments by one skilled in the art without departing from the scope or spirit of the invention.

What is claimed is:

1. In a system for recording and reproducing a composite color video signal consisting of a luminance signal and a chrominance signal and which comprises recording and reproducing portions:

said recording portion having means for frequency-modulating the luminance signal, means for frequency-converting the chrominance signal, means for combining the frequency-modulated luminance signal and the frequency-converted chrominance signal, and means for recording the combined signal on a magnetic media;

said reproducing portion having means for reproducing said combined signal from the magnetic media, means for extracting the frequency-modulated luminance signal and the frequency-converted chrominance signal from the reproduced combined signal, means for demodulating the frequency-modulated luminance signal, and means for reconverting said frequency-converted chrominance signal;

one of said portions of said system further having means producing a compensation signal at a frequency which is an integral multiple of the carrier frequency of the frequency-converted chrominance signal and with said compensation signal having a predetermined phase with respect to said carrier; and means for combining said compensation signal with the luminance signal in the respective portion of said system so as to avoid a beat interference.

2. A system according to claim 1, wherein said frequency of the compensation signal is the same as the second harmonic of said carrier of the frequency-converted chrominance signal.

3. A system according to claim 1, wherein said compensation signal is produced in the recording portion.

4. A system according to claim 3, wherein said compensation signal has the same frequency as said carrier of the frequency-converted chrominance signal.

5. A system according to claim 1, wherein said compensation signal is produced in said reproducing portion of the system.

6. A system for recording a composite color video signal consisting of a luminance signal and a chrominance signal, and which comprises means for extracting said luminance signal and said chrominance signal from said composite signal, means for frequency-modulating said luminance signal, means for frequency-converting said chrominance signal, means for producing a compensation signal at a frequency which is an integral multiple of the carrier frequency of the frequency-converted chrominance signal and with said compensation signal having a predetermined phase with respect to said carrier, means for combining said compensation signal with said luminance signal in advance of the frequency-modulation thereof, means for combining said frequency-modulated luminance signal having the compensation signal with said frequency-converted chrominance signal, and means for magnetically recording the resulting combined signal.

7. A system according to claim 6, wherein the frequency of said compensation signal is the second harmonic of the carrier frequency of said frequency-converted chrominance signal.

8. A system according to claim 7, in which said frequency-modulated luminance signal is utilized as a bias signal for said frequency-converted chrominance signal during recording.

9. A system according to claim 7, in which the level of said compensation signal is proportional to the square of the level of said frequency-converted chrominance signal.

10. A system according to claim 6, in which said compensation signal has the same frequency as said carrier of the frequency-converted chrominance signal.

11. A system for reproducing a color video signal from a magnetically recorded combined signal containing a frequency-modulated luminance signal and a frequency-converted chrominance signal, and which comprises:

means for magnetically reproducing said combined signal, means for extracting said frequency-modulated luminance signal and frequency-converted chrominance signal from the reproduced combined signal, means for demodulating the luminance signal, means for reconverting the chrominance signal, means for producing a compensation signal from the frequency-converted chrominance signal with the frequency thereof being an integral multiple of carrier frequency of the frequency-converted chrominance signal and with the phase of said compensation signal being predetermined with respect to said carrier, means for combining said compensation signal with the demodulated luminance signal so as to avoid beat interference by cancelling an harmonic of the carrier of said frequency-converted chrominance signal which appears in the demodulated luminance signal, and means for combining said demodulated luminance signal with said reconverted chrominance signal so as to substantially reconstitute the composite color video signal.

12. A system according to claim 11, in which said frequency of the compensation signal is the second harmonic of said carrier of the frequency-converted chrominance signal.

13. A system according to claim 12, in which said compensation signal has a level proportional to the square of the level of the frequency-converted chrominance signal.

14. In the recording and reproducing of a combined signal derived from a color video signal composed of a luminance signal and a chrominance signal, and in which said luminance signal is frequency-modulated and said chrominance signal is frequency-converted and combined with said frequency-modulated luminance signal to provide said combined signal which is recorded and reproduced; the method of avoiding beat interference of a harmonic of the carrier of said frequency-converted chrominance signal with said luminance signal comprising producing a compensation signal at a frequency which is an integral multiple of the frequency of said carrier of the frequency-converted chrominance signal and with the phase of said compensation signal being predetermined with respect to said carrier, and combining said compensation signal with said luminance signal so as to avoid said heat interference.

* * * * *